(12) United States Patent
Mazzara Bologna et al.

(10) Patent No.: US 10,400,653 B2
(45) Date of Patent: Sep. 3, 2019

(54) METHOD OF CONTROLLING A PARTICULATE FILTER

(71) Applicant: GM GLOBAL TECHNOLOGY OPERATIONS LLC, Detroit, MI (US)

(72) Inventors: Giuseppe Mazzara Bologna, Nicosia (IT); Isadora Ricci, Turin (IT); Stefano Pellegrino, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 192 days.

(21) Appl. No.: 15/235,759

(22) Filed: Aug. 12, 2016

(65) Prior Publication Data
US 2017/0044961 A1    Feb. 16, 2017

(30) Foreign Application Priority Data

Aug. 13, 2015 (GB) .................................. 1514398.5

(51) Int. Cl.
*F01N 9/00* (2006.01)
*F01N 3/023* (2006.01)
(Continued)

(52) U.S. Cl.
CPC ........... *F01N 9/002* (2013.01); *F01N 3/0232* (2013.01); *F01N 11/002* (2013.01); *F01N 3/035* (2013.01);
(Continued)

(58) Field of Classification Search
CPC ...... F01N 9/002; F01N 11/002; F01N 3/0232; F01N 2550/04; F01N 2900/1606; F01N 2900/1602; F01N 2900/1611; F01N 2900/0412; F01N 2560/14; F01N 2560/06; F01N 3/035; F01N 2900/0416; Y02T 10/47; F02D 41/025; F02D 41/1454;
(Continued)

(56) References Cited

U.S. PATENT DOCUMENTS 7,159,384 B2    1/2007 Otake et al.
2004/0123586 A1*  7/2004 Kuboshima ........... F01N 11/002
                                          60/277
(Continued)

FOREIGN PATENT DOCUMENTS

FR    2879244 A1    6/2006
FR    2915514 A1    10/2008
JP    2003083036 A   3/2003

OTHER PUBLICATIONS

Great Britain Patent Office, Great Britain Search Report for 3036 Application No. 1514398.5, dated Sep. 10, 2015.

*Primary Examiner* — Hung Q Nguyen
*Assistant Examiner* — Brian P Monahon
(74) *Attorney, Agent, or Firm* — Lorenz & Kopf LLP

(57) ABSTRACT

A method of controlling a particulate filter of an internal combustion engine is disclosed. A regeneration cycle of the particulate filter is initiated. During the regeneration, a value of an exhaust gas temperature at an outlet of the particulate filter is determined and a value of a residual soot quantity stored into the particulate filter is estimated on the basis of the measured value of the exhaust gas temperature at the outlet of the particulate filter. The regeneration cycle may be started and stopped based on the estimated residual soot quantity.

13 Claims, 2 Drawing Sheets

(51) Int. Cl.
*F01N 3/035* (2006.01)
*F01N 11/00* (2006.01)

(52) U.S. Cl.
CPC ...... *F01N 2550/04* (2013.01); *F01N 2560/06* (2013.01); *F01N 2560/14* (2013.01); *F01N 2900/0412* (2013.01); *F01N 2900/0416* (2013.01); *F01N 2900/0601* (2013.01); *F01N 2900/1602* (2013.01); *F01N 2900/1606* (2013.01); *F01N 2900/1611* (2013.01); *Y02T 10/47* (2013.01)

(58) Field of Classification Search
CPC ............... F02D 41/123; F02D 41/0295; F02D 41/1446; F02D 41/00
See application file for complete search history.

(56) References Cited

U.S. PATENT DOCUMENTS

| | | | |
|---|---|---|---|
| 2004/0211159 A1* | 10/2004 | Hamahata | F01N 3/0231 55/282.3 |
| 2005/0154523 A1* | 7/2005 | Yahata | F01N 9/002 701/108 |
| 2005/0188686 A1* | 9/2005 | Saito | F01N 3/023 60/297 |
| 2007/0006574 A1* | 1/2007 | Nakano | F01N 9/005 60/285 |
| 2007/0144146 A1* | 6/2007 | Kusatsugu | F01N 11/00 60/277 |
| 2009/0037082 A1* | 2/2009 | Takano | F01N 3/025 701/104 |
| 2010/0132558 A1* | 6/2010 | Busch | F01N 11/002 95/287 |
| 2010/0319319 A1* | 12/2010 | Ide | F01N 3/021 60/277 |
| 2012/0282159 A1* | 11/2012 | Takayanagi | B01D 46/0063 423/212 |
| 2012/0288410 A1* | 11/2012 | Takayanagi | F01N 9/002 422/105 |
| 2013/0327017 A1* | 12/2013 | Chavannavar | F01N 3/106 60/274 |
| 2015/0040539 A1* | 2/2015 | Tylutki | F01N 3/0256 60/274 |

* cited by examiner

METHOD OF CONTROLLING A PARTICULATE FILTER

CROSS-REFERENCE TO RELATED APPLICATION

This application claims priority to British Patent Application No. GB1514398.5, filed Aug. 13, 2015, which is incorporated herein by reference in its entirety.

TECHNICAL FIELD

The present disclosure pertains to a method of controlling a particulate filter of an internal combustion engine, typically an internal combustion engine of a motor vehicle.

BACKGROUND

Conventional internal combustion engines may be equipped with a particulate filter, which is located in an exhaust pipe of the engine to retain and remove soot from the exhaust gas. During the normal operation of the engine, an electronic control unit (ECU) is generally provided for estimating an overall quantity of soot which is stored into the particulate filter and for activating a regeneration of the particulate filter, when the overall quantity of soot exceeds a maximum allowable amount thereof. The regeneration is generally achieved by operating the internal combustion engine in such a way to increase the temperature of the particulate filter up to a value that triggers the combustion of the accumulated soot.

To estimate the overall quantity of soot stored into the particulate filter, the ECU needs to know the residual quantity of soot that was still present into the particulate filter at the end of last regeneration. This residual quantity of soot may be determined by the ECU in several different ways, one of which provides for determining, during the regeneration, the temperature and the mass flow rate of the exhaust gas at the inlet of the particulate filter. These parameters are then used as input of a calibration model that provides as output an estimation of a temperature inside the particulate filter. The estimated temperature is finally used to estimate the residual quantity of soot. However, the temperature estimation provided by the calibration model may be affected by a margin of error which is not always negligible, with the consequence that sometimes the estimation of the residual soot quantity and the correlated estimation of the overall soot quantity are not completely reliable.

To compensate for this unreliability, the maximum allowable level of soot that triggers the regeneration of the particulate filter must be maintained relatively small, thereby avoiding uncontrollable burning of soot but also increasing the number of regenerations and thus the fuel consumption and oil dilution.

SUMMARY

The present disclosure provides a solution for improving the reliability of the estimation of the residual soot quantity and thus obtaining a better management of the particulate filter regenerations with a simple, rational and rather inexpensive solution. An embodiment of the solution provides a method of controlling a particulate filter of an internal combustion engine during a regeneration of the particulate filter. During the regeneration, a value of an exhaust gas temperature at an outlet of the particulate filter is determined and a value of a residual soot quantity stored into the particulate filter is estimated on the basis of the measured value of the exhaust gas temperature at the outlet of the particulate filter. By taking into account the exhaust gas temperature at the outlet of the particulate filter, the proposed solution provides a more reliable estimation of the residual quantity of soot stored into that component, which implies a more accurate management of the regenerations. In particular, the enhanced reliability of the residual soot quantity estimation raises the maximum allowable level that triggers the regenerations, thereby reducing the overall number of regenerations and so reducing fuel consumption and oil dilution.

According to an aspect of the method, the estimation of the value of the residual soot quantity may determine a value of the exhaust gas mass flow rate at the inlet of the particulate filter and a value of the exhaust gas temperature at the inlet of the particulate filter, during the regeneration. A value of a temperature inside the particulate filter is estimated on the basis of the determined value of the exhaust gas mass flow rate at the inlet of the particulate filter, the determined value of the exhaust gas temperature at the inlet of the particulate filter, and the determined value of the exhaust gas temperature at the outlet of the particulate filter. The value of the residual soot quantity is determined on the basis of the estimated value of the temperature inside the particulate filter. The preliminary estimation of the temperature inside the particulate filter increases the reliability of the entire strategy.

In particular, the determination of the value of the residual soot quantity may use an estimated value of the temperature inside the particulate filter as input of a calibration model or map that yields as output a corresponding value of the residual soot quantity. This aspect of the present disclosure allows to determine the residual soot quantity with a minimum of computational effort.

According to another aspect of the method, the estimation of the value of the temperature inside the particulate filter may determine a base value of the temperature inside the particulate filter on the basis of the determined value of the exhaust gas mass flow rate at the inlet of the particulate filter and the determined value of the exhaust gas temperature at the inlet of the particulate filter. A difference between the determined value of the exhaust gas temperature at the outlet of the particulate filter and the determined base value of the temperature inside the particulate filter is determined. The base value of the temperature inside the particulate filter is corrected on the basis of the calculated difference. This aspect of the present disclosure allows to implement the present strategy as an adaptation of the conventional procedures.

In particular, the determination of the base value of the temperature inside the particulate filter may use the determined value of the exhaust gas mass flow rate at the inlet of the particulate filter and the determined value of the exhaust gas temperature at the inlet of the particulate filter as input of a calibration model or map that yields as output a corresponding base value of the temperature inside the particulate filter. This aspect of the present disclosure allows to determine the base value of the temperature inside the particulate filter with a minimum of computational effort.

According to another aspect of the method, the correction of the base value of the temperature inside the particulate filter may determine a correction value of the temperature inside the particulate filter on the basis of the calculated difference. The determined correction value is added to the base value of the temperature inside the particulate filter.

This aspect of the present disclosure provides an effective solution for estimating a reliable value of the temperature inside the particulate filter.

In particular, the determination of the correction value of the temperature inside the particulate filter may use the calculated difference as input of a calibration model or map that yields as output a corresponding correction value of the temperature inside the particulate filter. This aspect of the present disclosure allows to determine the correction value of the temperature inside the particulate filter with a minimum of computational effort.

An embodiment of the method may end the regeneration of the particulate filter, if the estimated value of the residual soot quantity is equal to or smaller than a predetermined value thereof. This embodiment provides a reliable criteria for ending the regeneration when the particulate filter is empty or almost empty of soot.

Another embodiment of the method may estimate a value of a quantity of soot accumulated in the particulate filter after the regeneration. A value of an overall quantity of soot stored into the particulate filter is calculated as a sum of the estimated value of the accumulated soot quantity and the estimated value of the residual soot quantity. Another regeneration of the particulate filter is started, if the calculated value of the overall soot quantity is equal to or larger than a predetermined threshold value thereof. This embodiment provides a reliable criteria for repeating the regeneration when the particulate filter is full or almost full of soot.

The present solution may be also embodied in the form of a computer program including a computer-code for performing, when run on a computer, the method described above, or in the form of a computer program product including a carrier on which the computer program is stored. Another embodiment may provide an electromagnetic signal modulated to carry a sequence of data bits which represent the computer program. Still another embodiment may provide an internal combustion engine equipped with a particulate filter and with an electronic control unit configured to carry out the steps of the method described above.

Another embodiment of the present disclosure provides an apparatus for controlling a particulate filter of an internal combustion engine, including an electronic control unit or other means configured to perform a regeneration of the particulate filter, determine, during the regeneration, a value of an exhaust gas temperature at an outlet of the particulate filter, and estimate a value of a residual soot quantity stored into the particulate filter on the basis of the measured value of the exhaust gas temperature at the outlet of the particulate filter. This embodiment of the solution achieves basically the same effects of the method above, particularly that of enhancing the reliability of the residual soot quantity estimation and thus improving the management of the regenerations of the particulate filter.

According to an aspect of the apparatus estimates the value of the residual soot quantity and may include an electronic control unit or other means further configured to determine, during the regeneration, a value of the exhaust gas mass flow rate at the inlet of the particulate filter and a value of the exhaust gas temperature at the inlet of the particulate filter and estimate a value of a temperature inside the particulate filter on the basis of the determined value of the exhaust gas mass flow rate at the inlet of the particulate filter, the determined value of the exhaust gas temperature at the inlet of the particulate filter, and the determined value of the exhaust gas temperature at the outlet of the particulate filter. The value of the residual soot quantity is determined on the basis of the estimated value of the temperature inside the particulate filter.

The preliminary estimation of the temperature inside the particulate filter, increases the reliability of the entire strategy. In particular, the electronic control unit or other means may be configured to use the estimated value of the temperature inside the particulate filter as input of a calibration model or map that yields as output a corresponding value of the residual soot quantity. This aspect of the present disclosure allows to determine the residual soot quantity with a minimum of computational effort.

According to another aspect of the apparatus, an estimation of the value of the temperature inside the particulate filter may be carried out by the electronic control unit or other means configured to determine a base value of the temperature inside the particulate filter on the basis of the determined value of the exhaust gas mass flow rate at the inlet of the particulate filter and the determined value of the exhaust gas temperature at the inlet of the particulate filter, calculate a difference between the determined value of the exhaust gas temperature at the outlet of the particulate filter and the determined base value of the temperature inside the particulate filter, and correct the base value of the temperature inside the particulate filter on the basis of the calculated difference. This aspect of the present disclosure allows to implement the present strategy as an adaptation of the conventional procedures.

In particular, the electronic control unit or other means may be configured to use the determined value of the exhaust gas mass flow rate at the inlet of the particulate filter and the determined value of the exhaust gas temperature at the inlet of the particulate filter as input of a calibration model or map that yields as output a corresponding base value of the temperature inside the particulate filter. This aspect of the present disclosure allows to determine the base value of the temperature inside the particulate filter with a minimum of computational effort.

According to another aspect of the method, correcting the base value of the temperature inside the particulate filter may be carried out by the electronic control unit or other means configured to determine a correction value of the temperature inside the particulate filter on the basis of the calculated difference, and add the determined correction value to the base value of the temperature inside the particulate filter. This aspect of the present disclosure provides an effective solution for estimating a reliable value of the temperature inside the particulate filter.

In particular, determining the correction value of the temperature inside the particulate filter may be carried out by the electronic control unit or other means configured to use the calculated difference as input of a calibration model or map that yields as output a corresponding correction value of the temperature inside the particulate filter. This aspect of the present disclosure allows to determine the correction value of the temperature inside the particulate filter with a minimum of computational effort.

In an embodiment of the apparatus the electronic control unit may be further configured to end the regeneration of the particulate filter, if the estimated value of the residual soot quantity is equal to or smaller than a predetermined value thereof This embodiment provides a reliable criteria for ending the regeneration when the particulate filter is empty or almost empty of soot.

In another embodiment of the apparatus, the electronic control unit or other means may be configured to estimate a value of a quantity of soot accumulated in the particulate filter after the regeneration, calculate a value of an overall quantity of soot stored into the particulate filter as a sum of the estimated value of the accumulated soot quantity and the estimated value of the residual soot quantity, and start another regeneration of the particulate filter, if the calculated value of the overall soot quantity is equal to or larger than a predetermined threshold value thereof This embodiment provides a reliable criteria for repeating the regeneration when the particulate filter is full or almost full of soot.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
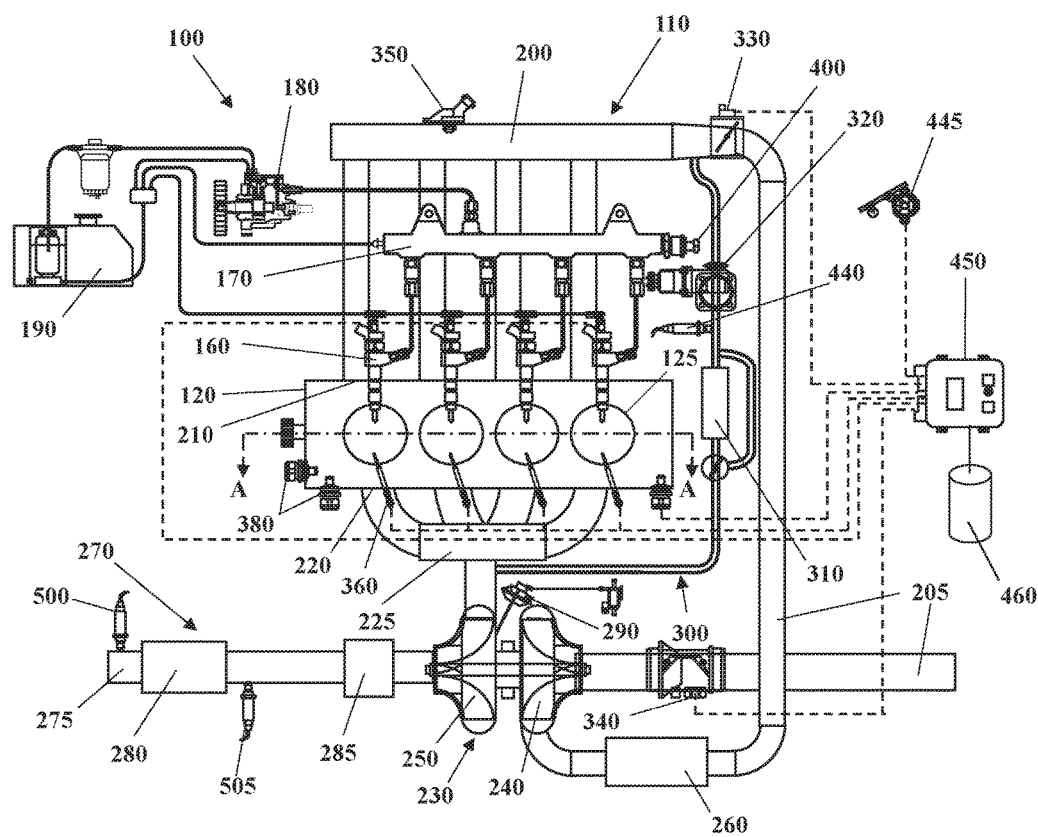
FIG. 1 shows an automotive system.
Figure 2:
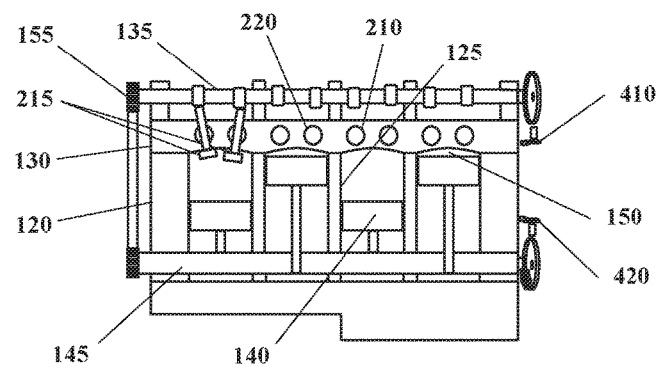
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head. 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190, .Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145, The air may be distributed to the air intake port(s) 210 through an intake manifold 200. An air intake duct 205 may provide air from the ambient environment to the intake manifold 200, In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250, This example shows a variable geometry turbine (VGT) with a VGT actuator 290 arranged to move the vanes to alter the flow of the exhaust gases through the turbine 250, in other embodiments, the turbocharger 230 may be fixed geometry and/or include a waste gate.

The exhaust gases exit the turbine 250 and are directed into an exhaust system 270, The exhaust system 270 may include an exhaust pipe 275 having one or more exhaust aftertreatment devices. The aftertreatment devices may include a particulate filter 280, which is located in the exhaust pipe 275 for trapping and thus removing soot from the exhaust gas. In some embodiment the particulate filter 280 may be coated with a selective reduction catalyst, thereby obtaining a single aftertreatment device, conventionally referred as Selective Catalytic Reduction on Filter (SCRF), which is able to trap the soot while converting the NOx contained. into the exhaust gas into diatonic nitrogen and water.

Upstream of the particulate filter 280, there may be other aftertreatment devices 285 configured to change the composition of the exhaust gases. Some examples include, but are not limited to, catalytic converters (two and three way), oxidation catalysts, lean NOx traps and hydrocarbon adsorbers. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

In order to operate the ICE 110, the ECU 450 is generally configured to determine the amount of fuel to be injected into the combustion chambers 150 and then to command the fuel injector 160 accordingly. Under normal conditions, the ECU 450 may be particularly configured to inject the fuel into the combustion chambers 150 according to a lean combustion mode, which means that the fuel injected quantities are determined so that the value of the air/fuel ratio into the combustion chambers 150 is larger than 1. While the ICE 110 is operating under these normal conditions, the soot contained into the exhaust gas is progressively trapped and accumulated inside the particulate filter 280. When the soot accumulated into the particulate filter 280 exceeds a maximum allowable amount thereof, the ECU 450 is generally configured to perform a regeneration of the particulate filter 280 in order to remove at least part of the accumulated soot.

The regeneration generally provides for the ECU 450 to increase the temperature of the particulate filter 280 up to a value that triggers the combustion of the accumulated soot, which is therefore progressively discharged. In particular, the temperature of the particulate filter 280 may be increased by raising the temperature of the exhaust gas that flows through it, for example by operating the ICE 110 according to a rich combustion mode, which means that the fuel injected quantities are determined so that the value of the air/fuel ratio into the combustion chambers 150 is smaller than 1. When the regeneration is over, the ECU 450 returns to operate the ICE 110 under the normal conditions.

Figures 3, 4:
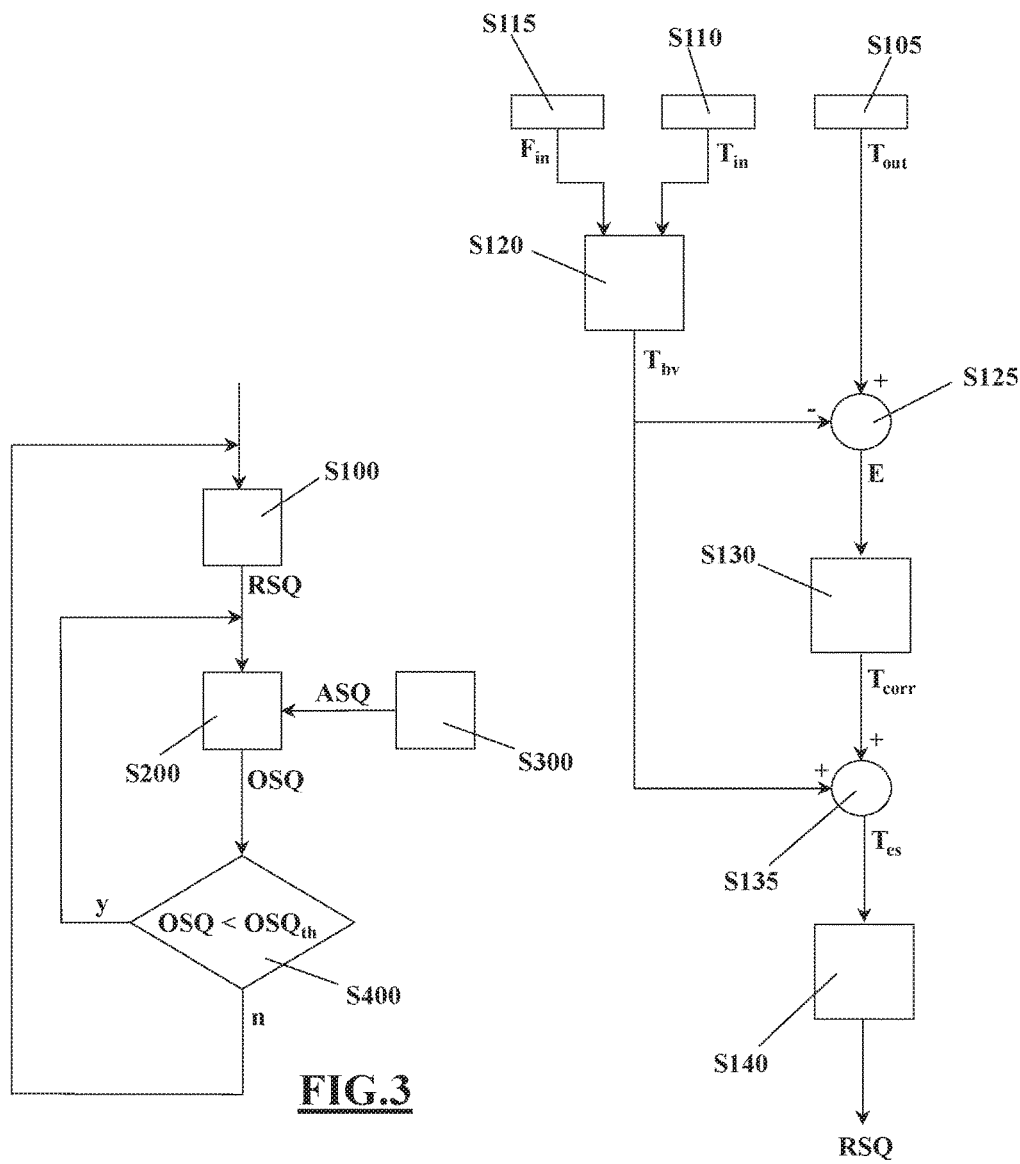
FIG. 3 is a flowchart of a method of controlling a particulate filter associate to the internal combustion engine.
FIG. 4 is a flowchart of a method of estimating a residual soot quantity inside the particulate filter.

In view of the above, during the operation of the ICE 110, the particulate filter 280 goes through an alternation of storing phases, during which the particulate filter 280 accumulates soot, and regenerations, during which the particulate filter 280 releases the accumulated soot. To control the timing of this alternation of storing phases and regenerations, the ECU 450 may be configured to execute the control strategy represented in the flow chart of FIG. 3.

During any regeneration, the ECU 450 may be particularly configured to estimate (block S100) a value RSQ of a residual quantity of soot that is still contained into the particulate filter 280. This estimation may be performed by the ECU 450 with the procedural steps represented in FIG. 4. As a first step, the ECU 450 may determine (block S105) a value Tout of an exhaust gas temperature at an outlet of the particulate filter 280. By way of example, the temperature value Tout may be measured by means of a temperature sensor 500 located in the exhaust pipe 275 at the outlet of the particulate filter 280 as shown in FIG. 1. Moreover, the ECU 450 may be configured to determine (block S110) a value Tin of an exhaust gas temperature at an inlet of the particulate filter 280, and a value Fin of a mass flow rate of the exhaust gas at the inlet of the particulate filter 280 (block S115). By way of example, the temperature value Tin may be measured by means of a second temperature sensor 505 located in the exhaust pipe 275 at the inlet of the particulate filter 280. On the other hand, the mass flow rate value Fin may be calculated as a function of some engine operating parameters, including for example engine speed (i.e. the rotational speed of the crankshaft 145) and/or engine load (i.e. fuel injected quantity).

The temperature value Tin and the mass flow rate value Fin of the exhaust gas at the inlet of the particulate filter 280 may be used by the ECU 450 to determine (block S120) a base value Tbv of a temperature inside the particulate filter 280. In particular, the base value Tbv may be determined by means of a calibration model or map that receives as input the determined value Fin of the exhaust gas mass flow rate and the determined value Tin of the exhaust gas temperature, and that yields as output the corresponding base value Tbv of the temperature inside the particulate filter 280. The calibration model or map may be determined with an experimental activity performed on a test bench and based on a study of the chemical species at the inlet of the particulate filter 280. This calibration model or map may then be stored in the memory system 460.

Afterwards, the ECU 450 may be configured to calculate (block S125) a difference E between the determined value Tout of the exhaust gas temperature at the outlet of the particulate filter 280 and the determined base value Tbv of the temperature inside the particulate filter 280. The difference E may then be used to determine (block S130) a correction value Tcorr of the temperature inside the particulate filter 280. In particular, the correction value Tcorr may be determined by means of a calibration model or map that receives as input the calculated difference E and that yields as output the corresponding correction value Tcorr of the temperature inside the particulate filter 280. This calibration model or map may be determined with an experimental activity performed on a test bench to determine how the temperature of the exhaust gas changes inside the particulate filter 280. This calibration model or map may then be stored in the memory system 460.

The correction value Tcorr may then be used to correct (block S135) the base value Tbv, in order to obtain an estimated value Tes of the temperature inside the particulate filter 280. By way of example, the correction may provide for adding the correction value Tcorr to the base value Tbv, thereby calculating the estimated value Tes of the temperature inside the particulate filter 280 with the following equation:

$$T_{es}=T_{bv}+T_{corr},$$

Afterwards, the ECU 450 may be configured to determine (block S140) the estimated value RSQ of the residual soot quantity inside the particulate filter 280 on the basis of the estimated value Tes of the particulate filter temperature. In particular, the value RSQ may be determined by means of a calibration model or map that receives as input the estimated value Tes of the particulate filter temperature and that yields as output the corresponding value RSQ of the residual soot quantity inside the particulate filter 280. The calibration model or map may be determined with an experimental activity performed on a test bench and then stored in the memory system 460.

The estimation of the residual soot quantity value RSQ may be cyclically repeated over time, as long as the regeneration of the particulate filter 280 is underway. When the regeneration ends, the last estimated value RSQ of the residual soot quantity is acquired (e.g. memorized) and used during the following storing phase of the particulate filter 280, as it will be explained hereinafter.

In this regard, some embodiments may prescribe that the ECU 450 ends the regeneration of the particulate filter 280 as soon as the estimated value RSQ of the residual soot quantity is equal to or smaller than a predetermined threshold value thereof, wherein this threshold value may be a calibration parameter that represents a condition in which the particulate filter 280 is empty or almost empty. Some other embodiments may provide other criteria for the ECU 450 to end the regeneration. For example, the ECU 450 may end the regeneration after a predetermined time since the beginning, or when other conditions occurs that indicate that the particulate filter 280 is empty or almost empty. Still other embodiments also prescribe that the ECU 450 may prematurely end (interrupt/abort) the regeneration, when the particulate filter 280 is not completely empty. That may happen for example when the operating conditions of the ICE 110 do not guarantee an effective and safe completion of the regeneration.

In any case, during the storing phase following the regeneration of the particulate filter 280 the ECU 450 may be configured to calculate (block S200 of FIG. 3) a value OSQ of an overall quantity of soot stored into the particulate filter 280. This calculation may provide for the ECU 450 to estimate (block S300) a value ASQ of a relative soot quantity that has been accumulated into the particulate filter 280 since the beginning of the storing phase or since the end of the last regeneration) and to sum this value ASQ to the last value RSQ of the residual soot quantity that was estimated before the end of the last preceding regeneration:

OSQ=RSQ+ASQ.

The calculated value OSQ may be compared with a threshold value OSQth thereof (block S400), wherein this threshold value OSQth may be a calibration parameter that represents the maximum allowable amount of soot that can be stored inside the particulate filter 280. This calibration parameter may be stored in the memory system 460. If the calculated value OSQ is smaller than the threshold value OSQth, the ECU 450 may operate the ICE 110 to continue the storing phase of the particulate filter 280 and repeat the calculation of the value OSQ. If conversely the calculated value OSQ is equal to or larger than the threshold value OSQth, the ECU 450 may operate the ICE 110 to start a new regeneration of the particulate filter 280, and the control method is repeated as described before.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of controlling a particulate filter of an internal combustion engine comprising:
    performing a regeneration of the particulate filter;
    determining a value of an exhaust gas temperature at an outlet of the particulate filter during the regeneration;
    determining a value of the exhaust gas mass flow rate at the inlet of the particulate filter and a value of the exhaust gas temperature at the inlet of the particulate filter during the regeneration;
    estimating a value of a temperature inside the particulate filter, wherein estimation of the value of the temperature inside the particulate filter comprises:
    determining a base value of the temperature inside the particulate filter on the basis of the determined value of the exhaust gas mass flow rate at the inlet of the particulate filter and the determined value of the exhaust gas temperature at the inlet of the particulate filter;
    calculating a difference between the determined value of the exhaust gas temperature at the outlet of the particulate filter and the determined base value of the temperature inside the particulate filter;
    correcting the base value of the temperature inside the particulate filter on the basis of the calculated difference to provide a corrected value of the temperature inside the particulate filter; and
    estimating a value of a residual soot quantity stored into the particulate filter on the basis of the measured value of the exhaust gas temperature at the outlet of the particulate filter and the corrected value of the temperature inside the particulate filter.

2. The method according to claim 1, wherein determination of the value of the residual soot quantity comprises using the estimated value of the temperature inside the particulate filter as input of a calibration model or map that yields as output a corresponding value of the residual soot quantity.

3. The method according to claim 1, wherein determination of the base value of the temperature inside the particulate filter comprises using the determined value of the exhaust gas mass flow rate at the inlet of the particulate filter and the determined value of the exhaust gas temperature at the inlet of the particulate filter as input of a calibration model or map that yields as output a corresponding base value of the temperature inside the particulate filter.

4. The method according to claim 1, wherein correction of the base value of the temperature inside the particulate filter comprises:
    determining a correction value of the temperature inside the particulate filter on the basis of the calculated difference; and
    adding the determined correction value to the base value of the temperature inside the particulate filter.

5. The method according to claim 4, wherein determination of the correction value of the temperature inside the particulate filter comprises using the calculated difference as input of a calibration model or map that yields as output a corresponding correction value of the temperature inside the particulate filter.

6. The method according to claim 1, further comprises ending the regeneration of the particulate filter, if the estimated value of the residual soot quantity is equal to or smaller than a predetermined value thereof.

7. The method according to claim 1 further comprises:
estimating a value of a quantity of soot accumulated in the particulate filter after the regeneration;
calculating a value of an overall quantity of soot stored into the particulate filter as a sum of the estimated value of the accumulated soot quantity and the estimated value of the residual soot quantity; and
starting another regeneration of the particulate filter, if the calculated value of the overall soot quantity is equal to or larger than a predetermined threshold value thereof.

8. A non-transitory computer readable medium comprising a computer-code for performing, when run on a computer, a method according to claim 1.

9. An internal combustion engine comprising a particulate filter and an electronic control unit configured to carry out a method according to claim 1.

10. A method of controlling a particulate filter of an internal combustion engine comprising:
initiating a regeneration of the particulate filter when a value of an overall soot quantity is equal to or greater than a threshold overall soot quantity, wherein the overall soot quantity includes a residual soot quantity and an accumulated soot quantity;
determining a value of an exhaust gas temperature at an outlet of the particulate filter during the regeneration;
determining a value of the exhaust gas mass flow rate at the inlet of the particulate filter and a value of the exhaust gas temperature at the inlet of the particulate filter during the regeneration;
estimating a value of a temperature inside the particulate filter, wherein estimation of the value of the temperature inside the particulate filter comprises:
determining a base value of the temperature inside the particulate filter on the basis of the determined value of the exhaust gas mass flow rate at the inlet of the particulate filter and the determined value of the exhaust gas temperature at the inlet of the particulate filter;
calculating a difference between the determined value of the exhaust gas temperature at the outlet of the particulate filter and the determined base value of the temperature inside the particulate filter;
correcting the base value of the temperature inside the particulate filter on the basis of the calculated difference to provide a corrected value of the temperature inside the particulate filter;
estimating a value of the residual soot quantity stored into the particulate filter based on the measured value of the exhaust gas temperature at the outlet of the particulate filter and the corrected value of the temperature inside the particulate filter;
completing the regeneration of the particulate filter, when the estimated value of the residual soot quantity is less than or equal to a threshold residual soot quantity;
estimating a value of the accumulated soot quantity in the particulate filter after completion of the regeneration; and
calculating the value of the overall soot quantity stored into the particulate filter as a sum of the estimated value of the accumulated soot quantity and the estimated value of the residual soot quantity.

11. The method according to claim 10, wherein determination of the base value of the temperature inside the particulate filter comprises using the determined value of the exhaust gas mass flow rate at the inlet of the particulate filter and the determined value of the exhaust gas temperature at the inlet of the particulate filter as input of a calibration model or map that yields as output a corresponding base value of the temperature inside the particulate filter.

12. The method according to claim 10, wherein correction of the base value of the temperature inside the particulate filter comprises:
determining a correction value of the temperature inside the particulate filter on the basis of the calculated difference; and
adding the determined correction value to the base value of the temperature inside the particulate filter.

13. The method according to claim 12, wherein determination of the correction value of the temperature inside the particulate filter comprises using the calculated difference as input of a calibration model or map that yields as output a corresponding correction value of the temperature inside the particulate filter.

* * * * *